US012684180B2

(12) United States Patent
Saini et al.

(10) Patent No.: US 12,684,180 B2
(45) Date of Patent: Jul. 14, 2026

(54) SYSTEM AND METHOD FOR GENERATIVE AI POWERED VIDEO SUMMARIZATION

(71) Applicant: Accenture Global Solutions Limited, Dublin (IE)

(72) Inventors: Vikas Saini, Meerut (IN); Debasmita Ghosh, Kolkata (IN); Swarnalata Patra, Pune (IN); Aaftab Ahmad, Akola (IN); Mainak Majumder, Kolkata (IN)

(73) Assignee: Accenture Global Solutions Limited, Dublin (IE)

( * ) Notice: Subject to any disclaimer, the term of this patent is extended or adjusted under 35 U.S.C. 154(b) by 105 days.

(21) Appl. No.: 18/818,284

(22) Filed: Aug. 28, 2024

(65) Prior Publication Data

US 2026/0067513 A1 Mar. 5, 2026

(51) Int. Cl.
*H04N 21/2343* (2011.01)
*H04N 21/234* (2011.01)
(Continued)

(52) U.S. Cl.
CPC ... *H04N 21/23424* (2013.01); *H04N 21/8456* (2013.01); *H04N 21/8549* (2013.01)

(58) Field of Classification Search
None
See application file for complete search history.

(56) References Cited

U.S. PATENT DOCUMENTS

2012/0082228 A1* 4/2012 Su .......................... H04L 45/745
375/E7.125
2019/0205654 A1* 7/2019 Grundmann ......... G06V 10/771
(Continued)

OTHER PUBLICATIONS

Huynh Lam Hai Dang and Ho Thi Ngoc Phu'o'ng, "Enhancing Video Summarization with Context Awareness," University of Science Advanced Program in Computer Science, Ho Chi Minh City, 2023 (arXiv:2404.04564v1 [cs.CV] Apr. 6, 2024), 138 pages.
(Continued)

*Primary Examiner* — Brian T Pendleton
*Assistant Examiner* — Jean D Saint Cyr
(74) *Attorney, Agent, or Firm* — Seed Intellectual Property Law Group LLP

(57) ABSTRACT
The present disclosure relates to a technique for summarizing long videos to short videos using generative artificial intelligence (AI). A method for converting an original video into a merged video by first receiving the original video, text based on the original video, and a list of summarization instructions. Thereafter, to first generate timestamps for first discrete chunks of the text, each timestamp defining a start time of the corresponding first discrete chunk within the original video. Further, receiving a summary of the text based on the summarization instructions, that includes second discrete chunks from the text. The method then discloses first and second vectorizing the first and second discrete chunks of the text, respectively, to define first and second vectors, respectively. Thereafter, matching each of the second vectors to its corresponding one of the first vectors and identify, for the matched second vectors, the timestamp for the corresponding first vector. Accordingly, extract video clips from the original video and stitch the extracted video clips together to create the merged video.

17 Claims, 7 Drawing Sheets

(51) Int. Cl.

| | |
|---|---|
| *H04N 21/235* | (2011.01) |
| *H04N 21/236* | (2011.01) |
| *H04N 21/4402* | (2011.01) |
| *H04N 21/845* | (2011.01) |
| *H04N 21/8549* | (2011.01) |

(56) References Cited

U.S. PATENT DOCUMENTS

| | | | |
|---|---|---|---|
| 2020/0186852 A1* | 6/2020 | Ramamurthy ... | H04N 21/47202 |
| 2024/0320952 A1* | 9/2024 | Petitpont ............. | G06V 10/761 |

OTHER PUBLICATIONS

Hua, Hang, et al., "V2Xum-LLM: Cross-Modal Video Summarization with Temporal Prompt Instruction Tuning," arXiv:2404. 12353v1 [cs.CV] Apr. 18, 2024, 15 pages.

Stevica Cvetkovic, et al., "Video Summarization using color features and efficient adaptive threshold techniques," Jan. 2013, 5 pages.

* cited by examiner

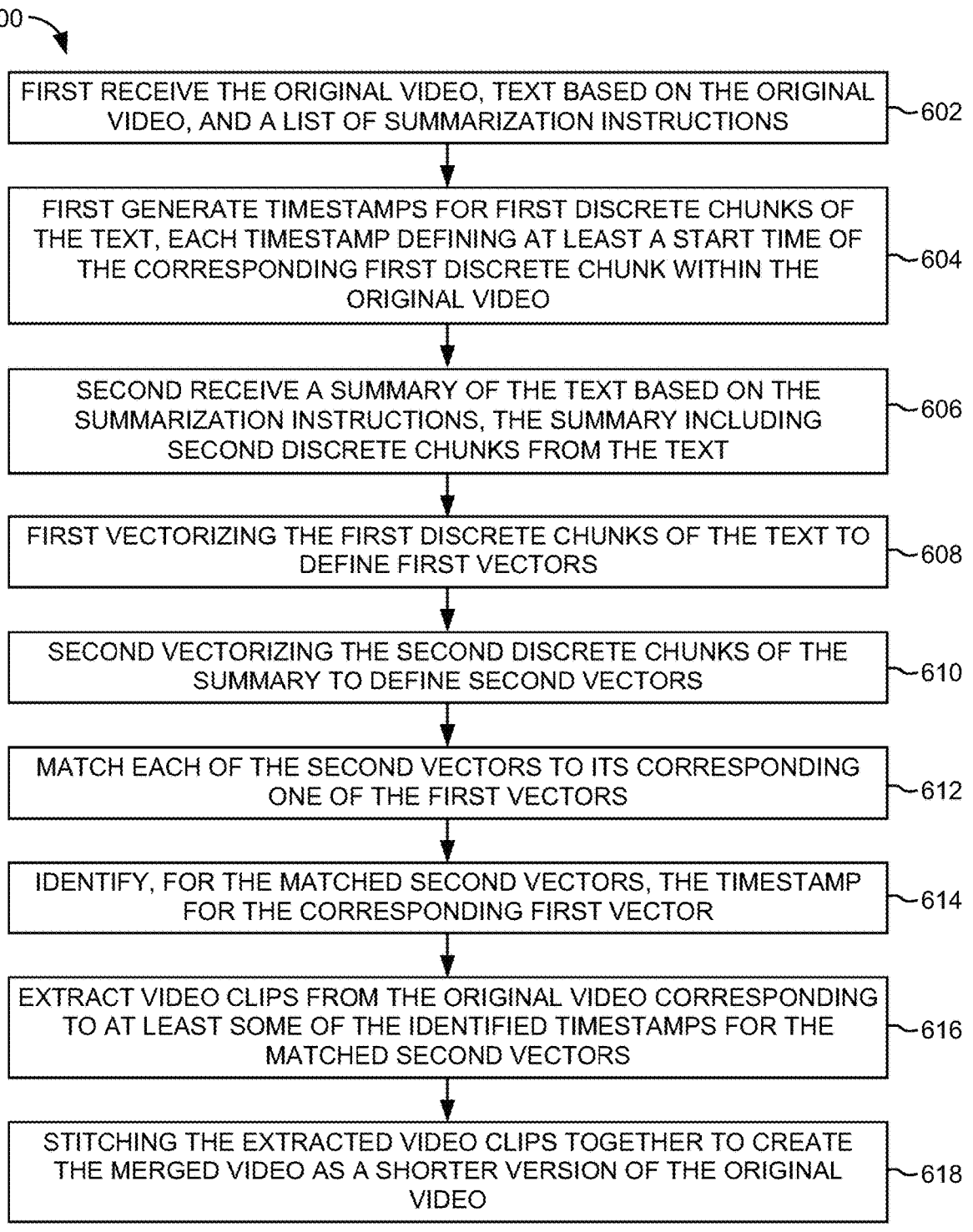

600

FIRST RECEIVE THE ORIGINAL VIDEO, TEXT BASED ON THE ORIGINAL VIDEO, AND A LIST OF SUMMARIZATION INSTRUCTIONS ~602

FIRST GENERATE TIMESTAMPS FOR FIRST DISCRETE CHUNKS OF THE TEXT, EACH TIMESTAMP DEFINING AT LEAST A START TIME OF THE CORRESPONDING FIRST DISCRETE CHUNK WITHIN THE ORIGINAL VIDEO ~604

SECOND RECEIVE A SUMMARY OF THE TEXT BASED ON THE SUMMARIZATION INSTRUCTIONS, THE SUMMARY INCLUDING SECOND DISCRETE CHUNKS FROM THE TEXT ~606

FIRST VECTORIZING THE FIRST DISCRETE CHUNKS OF THE TEXT TO DEFINE FIRST VECTORS ~608

SECOND VECTORIZING THE SECOND DISCRETE CHUNKS OF THE SUMMARY TO DEFINE SECOND VECTORS ~610

MATCH EACH OF THE SECOND VECTORS TO ITS CORRESPONDING ONE OF THE FIRST VECTORS ~612

IDENTIFY, FOR THE MATCHED SECOND VECTORS, THE TIMESTAMP FOR THE CORRESPONDING FIRST VECTOR ~614

EXTRACT VIDEO CLIPS FROM THE ORIGINAL VIDEO CORRESPONDING TO AT LEAST SOME OF THE IDENTIFIED TIMESTAMPS FOR THE MATCHED SECOND VECTORS ~616

STITCHING THE EXTRACTED VIDEO CLIPS TOGETHER TO CREATE THE MERGED VIDEO AS A SHORTER VERSION OF THE ORIGINAL VIDEO ~618

FIG. 6

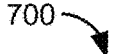

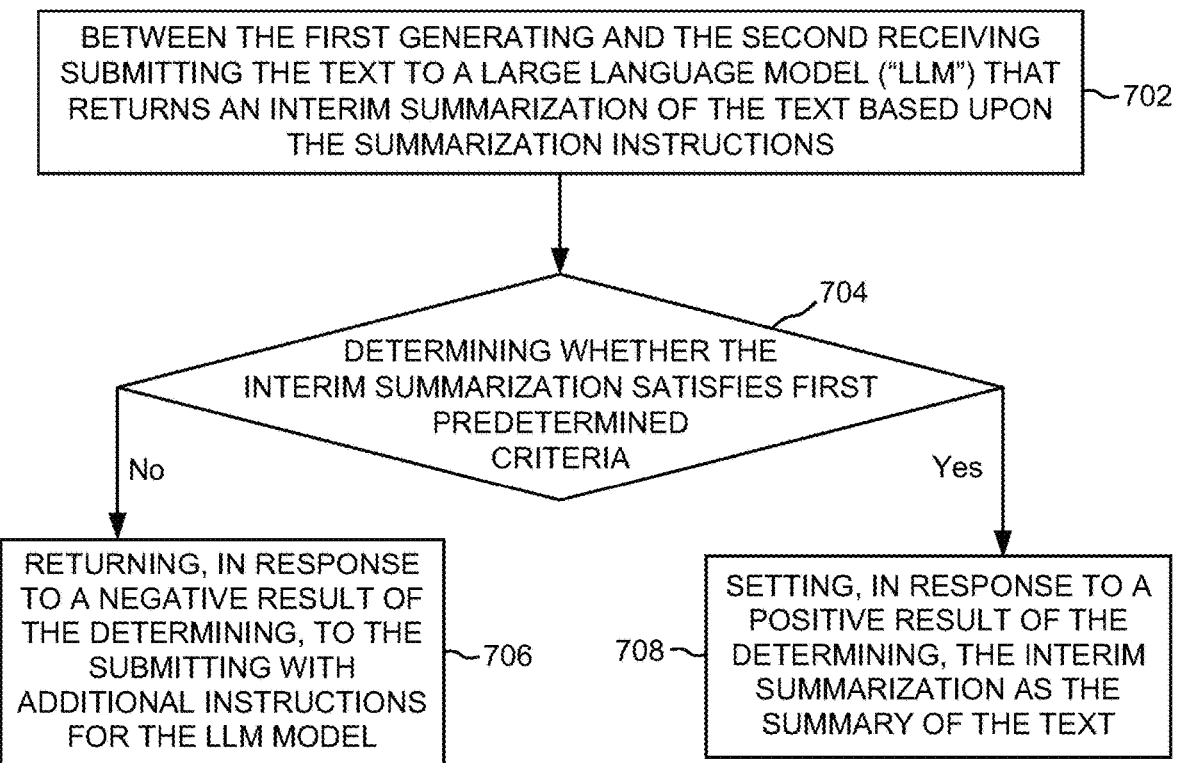

BETWEEN THE FIRST GENERATING AND THE SECOND RECEIVING SUBMITTING THE TEXT TO A LARGE LANGUAGE MODEL ("LLM") THAT RETURNS AN INTERIM SUMMARIZATION OF THE TEXT BASED UPON THE SUMMARIZATION INSTRUCTIONS ─702

DETERMINING WHETHER THE INTERIM SUMMARIZATION SATISFIES FIRST PREDETERMINED CRITERIA ─704

No

Yes

RETURNING, IN RESPONSE TO A NEGATIVE RESULT OF THE DETERMINING, TO THE SUBMITTING WITH ADDITIONAL INSTRUCTIONS FOR THE LLM MODEL ─706

708─ SETTING, IN RESPONSE TO A POSITIVE RESULT OF THE DETERMINING, THE INTERIM SUMMARIZATION AS THE SUMMARY OF THE TEXT

FIG. 7

SYSTEM AND METHOD FOR GENERATIVE AI POWERED VIDEO SUMMARIZATION

FIELD OF THE INVENTION

Various embodiments described herein generally relate to video summarization. More specifically, the present disclosure relates to a technique to summarize long videos to short videos using generative artificial intelligence (AI).

BACKGROUND

Users want to spend minimum time and effort in going through large videos to locate a specific video or moment they want to watch or share. Additionally, the video data can consume a large amount of storage space. Industries across the board face the challenge of distilling long-form video content into concise summaries tailored to specific objectives. Traditionally, this task has been outsourced to agencies, a route that is both time-intensive and still faces difficulty to match the expected quality even after putting huge computing resources and storage. The market currently lacks a solution that can autonomously process extensive videos and produce summarized content based on the user-defined goals.

SUMMARY

Implementations of the present disclosure are generally directed to a Generative Artificial Intelligence (AI) powered technique for video summarization. The disclosed technique discloses extractive summarization technique where no extra sentence or phrase is included in the summarized video like abstractive summarization. The final summarized video is obtained by extracting the short clips based on the user objective or user requirement from the original video and then combining all the clips together to produce a short-form video or summarized video. This technique efficiently provide automated summarized videos by using generative AI models as disclosed in the present disclosure.

According to an embodiment of the invention, a method for converting an original video into a merged video is disclosed. The method includes a step to first receive the original video, text based on the original video, and a list of summarization instructions as input to a system. Thereafter, to first generate timestamps for first discrete chunks of the text. Each of these time stamps define at least a start time off the corresponding first discreet chunk within the original video. Further, the method secondly discloses to receive a summary of the text based on the summarization instructions. The summary includes second discrete chunks from the text. The method then discloses first vectorizing the first discrete chunks of the text to define first vectors and secondly vectorizing the second discrete chunks of the summary to define second vectors. Thereafter, matching each of the second vectors to its corresponding one of the first vectors. In the next step, identify, for the matched second vectors, the timestamp for the corresponding first vector. Accordingly, extract video clips from the original video corresponding to at least some of the identified timestamps for the matched second vectors. Consequently, stitch the extracted video clips together to create the merged video as a shorter version of the original video.

The present disclosure further describes a system for implementing the method provided herein. The present disclosure also describes a non-transitory computer readable media storing instructions programmed to cooperate with electronic computer hardware in combination with software to perform operations for converting an original video into a merged video. The computer-readable media storing instructions couple to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various embodiments in accordance with the present disclosure will be described with reference to the drawings, in which:

FIG. 6 illustrates an exemplary flow diagram as an example method for video summarization, in accordance with present disclosure.

FIG. 7 illustrates an example method to determine interim summarization in accordance with present disclosure.

Like reference numbers and designations in the various drawings indicate like elements.

DETAILED DESCRIPTION

Figure 1:
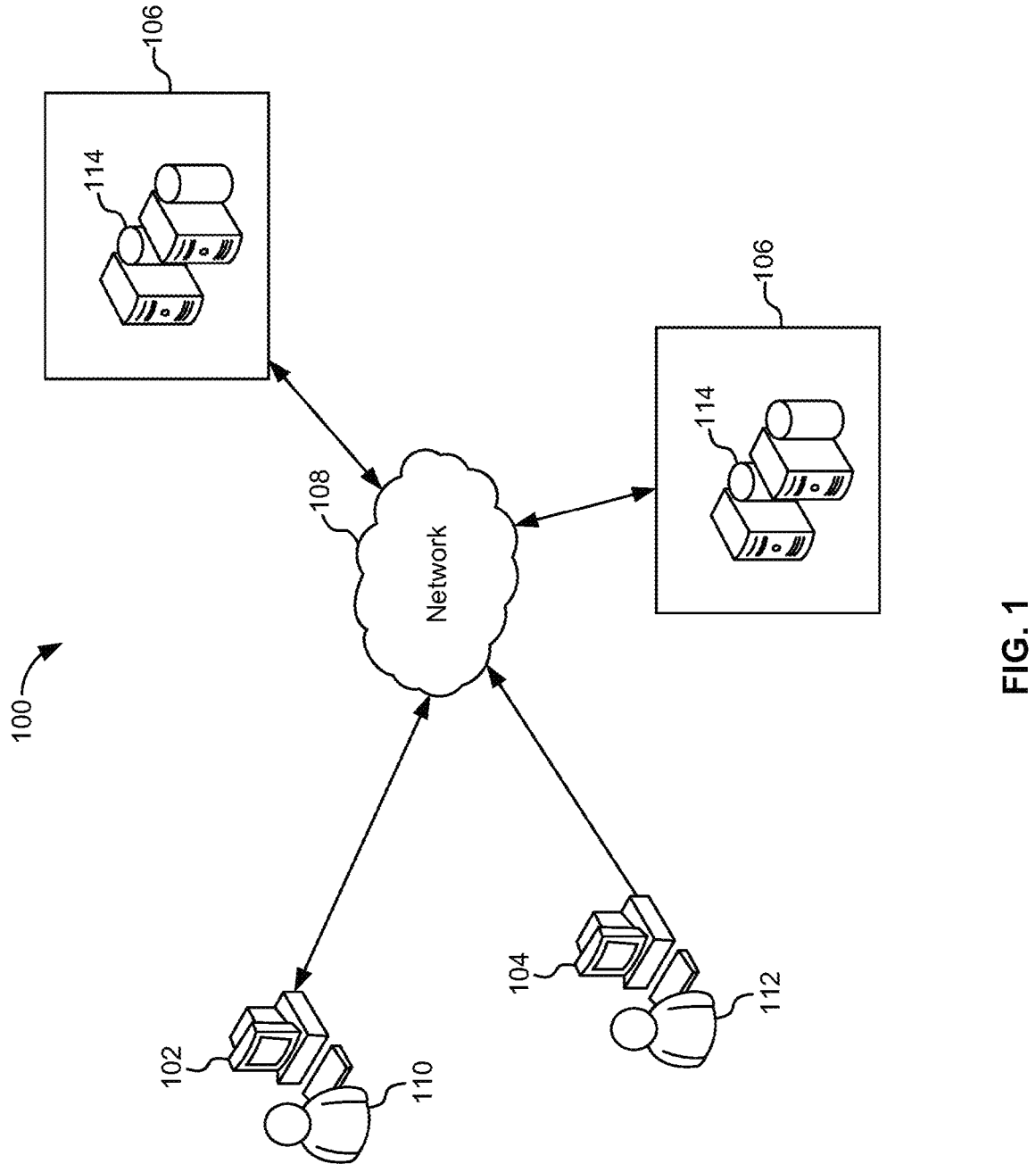
FIG. 1 illustrates an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

References to one or an embodiment in the present disclosure can be, but not necessarily are, references to the same embodiment; and such references mean at least one of the embodiments.

Reference to any "example" herein (e.g., "for example", "an example of", by way of example" or the like) are to be considered non-limiting examples regardless of whether expressly stated or not.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "learning model" is defined to be essentially conforming to the particular dimension, shape, or other feature that the term modifies, such that the component need not be exact. For example, "graph may be defined as knowledge graph, sanitized may be defined as redacted, filler information may be defined as fake value or fake information and confidential may be defined as restricted.

The term "comprising" when utilized means "including, but not necessarily limited to"; it specifically indicates open-ended inclusion or membership in the so-described combination, group, series and the like.

The term "a" means "one or more" unless the context clearly indicates a single element.

The term "about" when used in connection with a numerical value means a variation consistent with the range of error in equipment used to measure the values, for which ±5% may be expected. Non-numerical uses of "about" carry similar variation.

"First," "second," etc., re labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

"Merged video" means a video stitched together from clips of a longer video.

"Discrete chunks" of text refer to a subset of words from the text. A non-limiting example of discrete chunks of text are discrete sentences found within the text, or a discrete portion of a sentence found within the text. Preferably discrete chunks do not overlap, although the invention is not so limited, and overlap may be present.

Summarization instructions" refer to instructions that guide what to focus on or disregard in the text to generate the summary. Summarization instructions may include at least one function and at least one keyword subject to the function. By way of non-limiting example, "summarize the video by focusing on timestamp 30-45 seconds" has a function of "focus" and keywords of "30-45 seconds." In another example, the instructions could be "prioritize timestamp 30-45 over 60-75". In another example, the instruction could be "exclude any mention of drugs." The invention is not limited to any specific instruction other than the instruction guiding for the LLM to direct its efforts.

"Matching," "matches," or the like refers to determining a correspondence between two parameters within a predefined degree of certainty. A 100% predefined degree of certainty would require an exact match. A 90% predefined degree of certainty would allow for "substantially similar" items to be considered a match. To the extent not explicitly disclosed herein, general methods for determining similarity relative to defined ranges of certainty known to those of skill in the art are not set forth in detail herein.

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

The specification and drawings are to be regarded in an illustrative rather than a restrictive sense. It will, however, be evident that various modifications and changes may be made there onto without departing from the broader spirit and scope of the invention as set forth in the claims.

For simplicity and illustrative purposes, the present disclosure is described by referring mainly to examples thereof. The examples of the present disclosure described herein may be used together in different combinations. In the following description, details are set forth in order to provide some examples that may be considered in at least one of the following ways in the present disclosure.

Industries across the board face challenges of distilling long-form video content into concise summaries tailored to specific objectives. There is requirement of a solution that can autonomously process extensive videos and produce summarized content based on user-defined goals. Traditionally used manual editing process requires large amount of computing resources to address manual demands, struggles with maintaining consistency across various edits, and leads to extended turnaround times and decreased productivity.

The present disclosure discloses a Gen AI powered video summarizer to efficiently condense long video content into engaging, short-form videos. The short videos can summarize videos with or without audio narration, tailored to user-defined contexts. This tool focuses on generating concise versions of the original videos that align with specific summarization objective provided by the user. The applications of the video summarizer include but not limited to creating thematic brand marketing content for social media, producing bite-sized educational videos from extensive learning materials, identifying key instructional segments in lengthy video manuals, summarizing lengthy scientific seminars in the pharmaceutical industry, and condensing news videos on required subjects etc.

The video summarizer disclosed in the present disclosure automates and refines the content adaptation process, offering a swift, flexible, and efficient alternative for creating dynamic short-form videos. The video summarizer transforms the landscape of video content production, empower companies to efficiently utilize their digital media and extract key information that can be used for many purposes including but not limited to video search, information extraction from medical videos and many more. It facilitates creative experimentation, enabling users to effortlessly generate multiple versions of summarized video content, thus saving resources, time and increasing productivity.

FIG. 1 illustrates an environment of a system in accordance with some implementations of the present disclosure. System 100 includes numerous elements for purposes of illustration rather than limitation. It may be noted that system 100 may include the same, more, or fewer elements configured in the same or different manner in other implementations.

System 100 includes several computing devices 102-108. The computing devices 102-108 may be embodied, for example, desktop computing devices, smartphones, laptops, tablet, voice-enabled devices, a workstation, a personal computer, a notebook, and/or the like. In some examples, the computing devices 102-108 are used by respective users 402 (disclosed in FIG. 4) to log into and interact with computing platforms executing applications according to implementations of the present disclosure. The network connects websites, the computing devices 102-108, and the back-end systems like data storage 126, storage units 134 and/or 144 (data storage 126 and storage units 134 144 may interchangeably be referred to as back-end systems). The storage unit 134 may further include neural cache arrays 136 to 142, for example, which may for simplicity be represented as storage 1, storage 2, storage 3 and storage 4. The storage units 144 may further include neural cache arrays 146 to 152, for example, which may for simplicity be represented as storage 1, storage 2, storage 3 and storage 4. The computing devices 102-108 may have several computing applications installed on the computing devices to perform various functions. These applications interact with the system 100 components using an API layer 112. The API layer 112 acts as a bridge between the applications in computing devices and underlying system 100. The primary function of the API layer 112 may be to provide an interface for API calls and requests. By seamlessly integrating, communicating, and sharing data and functionalities via APIs, the API layer enables efficient interaction between the applications in computing devices 102-108 and the storage units 134, 144.

In some examples, a network that supports interaction/communication between the computing devices and other components of the system 100, may include but not limited to a Local Area Network (LAN), a Wide Area Network (WAN), Internet, or a combination thereof. In some examples, the network of the system 100 may be accessed over a wired and/or a wireless communication link. For example, a computing device like smartphone may utilize a cellular network to access the network 108.

In some examples, one or more of the back-end systems 106, 114, may be implemented as an on-premises system that is operated by an enterprise or a third-party engaged in cross-platform interactions and data management. In some examples, the back-end systems 106, 114 may be implemented as an off-premises system (for example, cloud or on-demand) that is operated by an enterprise or a third-party on behalf of an enterprise. In some examples, the back-end systems 106, 114 may be implemented in a cloud environment. For simplicity, the back-end systems 104 and 144 depicted in FIG. 1 may be a cloud environment that is intended to represent various forms of servers including a web server, an application server, a proxy server, a network server, a server pool, and/or the like. The storage unit 1, 114 may further disclose various storages, for example but not limited to SharePoint, Documentum, AWS S3, Dropbox and so on. The storage unit 2, 114 may further disclose various storages, for example but not limited to SharePoint, Azure Blobs, GCP Buckets, File System and so on. Further, the back-end system 106, which may be exemplary illustrated as data storage 126, may be a centralized storage system or master storage that manages and stores data for applications, websites, or services. For example—the data storage 106 can be a central database that is capable of storing indexes, metadata (json or xml) and/or data in relational form. The data storage 126 may further include an index store 128, a metadata 130 and a data store 132. The index store 128 (interchangeably referred to as index structure) stores (key, value) pairs or particulars, sometimes referred to as a dictionary/map/items. The primary function of the index store is to efficiently access a given record based on a particular field. Accordingly, instead of scanning through the entire collection, the index store 128 searches the desired record in the index. The metadata 130 includes attributes like file creation time, file type, size, modification history and so on. Such details help to manage and organize data effectively. The data store 132 is a temporary storage in the data storage 106.

In some examples, each of the back-end systems 106, and 114 are coupled to one or more processors 114. The processor 114 may host components of enterprise systems and applications. Also, the processor 114 accepts requests from the computing devices 102-108 for services being provided by the enterprise systems and the applications. In response to the accepted requests, the processor 114 provides the requested services to the computing devices 102-108 over the network. The requests received from the computing devices 102-108 may be text prompts. The text prompts may be used as a mode of interaction with a Machine Learning (ML) system or a neural network. In some examples, the GAI system may be implemented by the enterprise systems for generating responses/outputs for the text prompts or for performing one or more specified tasks in response to the text prompts. Examples of the tasks may include question-answers, data analysis, searching from the database and/or the like.

The processor 114 provide services for the back-end systems 126, 134, 144, that may include multiple components but are not limited to a search block 118, a file versioning block 122, a virus scan block 120, an audit logging block 124 and so on. The search block 118 searches a file requested by the computing devices. The virus scan block 120 scans all input files received from the computing system 1, computing system 2, computing system 3 and computing system 4, 102-108 for any risks or viruses before storing the received file into the backend systems. The file versioning block 122 stores different versions of files that are made over the time due to changes in the file or the formats of the file. The audit logging block 124 systematically record events, actions, and changes within a computer system, network, application, or database. These recorded events are stored in a structured and chronologically ordered format within files or databases known as audit logs. The audit logs may contain one or more of timestamp, event description and tags, users and entities, action types of data access details, error information, transaction details, and so on. The processor 114 may be coupled to a storage wrapper 116. The storage wrapper 116 simplify the usage of complex or low-level functionality by offering a higher-level, user-friendly interface. They abstract away underlying complexity, providing consistent methods or classes that developers can easily understand and utilize. The API layer 112, the processor 114, the storage wrapper 116 and may include further components that together discloses neural network based data storage 110.

Figure 2:
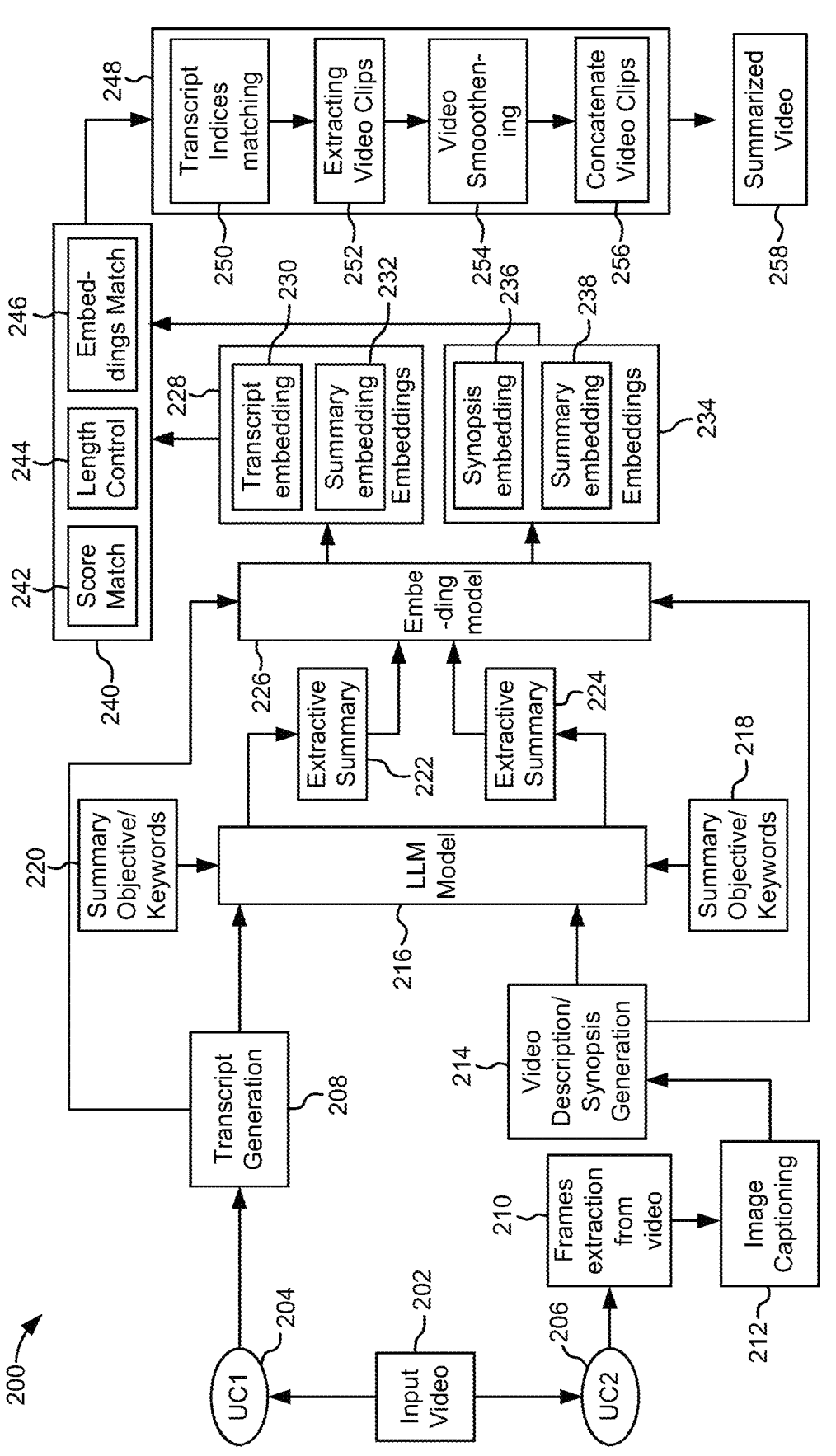
FIG. 2 illustrates an exemplary block diagram of video summarization system, in accordance with the present disclosure.

FIG. 2 illustrates an exemplary block diagram of video summarization system 200, in accordance with the present disclosure.

The video summarizer system 200 discloses a Gen AI powered video summarizer to efficiently condense long video content into engaging, short-form videos. The video summarizer system 200 receives an original video (may be interchangeably referred to as input video) as an input that needs to be summarised. The original video may be converted to video transcript or synopsis (video transcript may interchangeably be referred to as an original transcript), which passes through Gen AI model, for example, but not limited to large language model (LLM model) to extract an extractive summary. The extractive summary may be verified, so that no new content on word or sentence may be added to the extractive summary as compared to the original transcript. Rather the extractive summary should be defined as extracted out of the original transcript (may interchangeably be referred to as transcript or synopsis). Moreover, the extractive summary should be in the order of the original transcript and should be of required length. The extractive summary passes through an embedding model to generate vectors and these vectors may then be passed for optimization. After optimization, the obtained transcript indices may be processed to extract video clips that may be smoothened and concatenated to generate short-form videos or a summarized video.

The video summarizer system 200 (may be interchangeably referred to as system) receives the original video at an input video block 202 that needs to be summarised. The original video may be categorised into two categories UC1 204 and UC2 206 based on whether it contains human narration or not. For example, in the present disclosure, let's consider the original video containing human narration at UC1 204. In another example as disclosed in the present disclosure, let's consider the original video without human narration as UC2 206. In other words, the system 200 performs operations that comprise to determine whether the original video includes human narration add secondly generating, in response to a positive result of the determining, a transcript 5 of the original video as the text. Alternatively, in response to a negative result of the determining, thirdly generating text by sampling image frames of the original video at predetermined intervals, creating a text caption for each of the sampled image frames, and combining the created text captions, in order, to define the text.

Considering the UC1 path where the original video from input video block 202, having human narration at UC1 204 is received, the original video passes through transcript generation block 208 for transcript generation. The transcript generation block 208 may disclose a transformer based model for transcript generation from the original video file. The model may be optimized for transcribing audio files that contain speech in English. Utilizing an open-source speech-to-text model, the transcript generation block 208 extracts the audio transcript and timestamps for each phrase, supporting multiple languages. In an example, an Automatic Speech Recognition (ASR) model may be used to convert Audio-Visual recording to written text. The transcript may then be translated into English for further processing. In another example, the ASR model may have integration with Language Model (LM) to leverage language understanding to improve accuracy.

In an example, a pre-trained Deep Learning based Transcription model with encoder-decoder architecture may be used. The Audio may be preprocessed by converting it into a particular frequency, for example—a Mel-frequency cepstral (MFCC), and then passed into an encoder. A decoder may be trained to predict the corresponding text caption, intermixed with special tokens that direct the single model to perform tasks such as language identification, phrase-level timestamps, multilingual speech transcription, and to-English speech translation. Context-aware Lookback transcription may be performed to increase the accuracy. The output text may be segmented based on timestamps. In one of the example, the output format is: [{'text': 'This is the text spoken.', 'timestamp': (0.0, 2.44)}, {'text': 'This is the following text spoken.', 'timestamp': (2.44, 5.02)}]. After first receiving, first generating timestamps for first discrete chunks of the text, each timestamp defining at least a start time of the corresponding first discrete chunk within the original video. The first discrete chunks of text correspond to discrete sentences in the text, and the second discrete chunks correspond to a subset of the discrete sentences in the text and/or portions of individual discrete sentences in the text. The segmented text may then be sent to a Large Language Model (LLM model) 216 and an Embedding model 226. Another input to the LLM model 216 may be provided by summary objective/keywords block 220. The summary objective/keywords block 220 provides prompt to the LLM model 216 disclosing which method to be selected.

The LLM model 216 first receive (may be interchangeably referred to as first receiving) the original video, text based on the original video, and a list of summarization instructions. The Large Language Model (LLM) 216 generates a summary based on user-specified keywords in block 220, focusing on relevant content. For instance, if the video covers various Indian states and the user is interested only in Maharashtra and Kerala, our Gen AI driven extractive summarization logic selectively extracts pertinent content. The system 200 operations further include second receiving (may interchangeably be referred to as secondly receive), a summary of the text based on the summarization instructions, the summary includes second discrete chunks from the text. Thereafter, between the first generating and the second receiving, submit the text to the LLM model 216 that returns an interim summarization of the text based upon the summarization instructions. In an example, the summarization instructions may be received from the summary objective/keywords block 220. The system operations further determine whether the interim summarization satisfies first predetermined criteria. The first predetermined criteria include a maximum text length of the interim summarization, the interim summarization includes content that matches content of the text and/or an order of content within the interim summarization matches an order in which content is present in the text. In response to a negative result of the determining, return to submit with additional instructions for the LLM model 216. The additional instructions include to produce the interim summarization within a maximum length, remove content from the interim summarization that is different from content of the text and/or maintain an order of content as present in the text. Alternatively, in response to a positive result of the determining, set the interim summarization as the summary of the text.

The summary objective/keyword block 220 (interchangeably may be referred to as summarization module) may provide to LLM model 216 a free flow text defining a customized summarization to provide function and its objective to guide what needs to be summarized. For example, a user may define its objective using a short message that "search for a particular drug without including an Organism." In general, there may be two types of summary generation, i.e-abstractive summary generation and extractive summary generation. In the present disclosure, the LLM model 216 may be provided a prompt to generate extractive summary or chunks. Summary objective is parameter for prompt and then an extractive summary block 222 generates the interim summarization as the summary of the text.

As illustrated in FIG. 2, UC2 206 discloses music-only or silent Videos without human voice in the video feed. For videos with background music or no audio, the system 200 segments the video into frames, extracting specific intervals. Each frame may be analyzed using an open-source multimodal model to generate descriptive captions, constructing a narrative of the video content. This process mirrors the first use case of UC1, where a summary is generated, aligned with user-defined keywords. The system then identifies the most relevant captions through cosine similarity assessments, facilitating the extraction and combination of corresponding video frames to create a coherent summary video.

In an aspect, when the original video is without human narration as disclosed at UC2 206, thirdly generating text by sampling image frames of the original video at predetermined intervals, creating a text caption for each of the sampled image frames, and combining the created text captions, in order, to define the text.

To perform image frames extraction on the original video received from UC2 206 at frames extraction from video block 210, based on its motion complexity, scene changes, and so the overall visual activity. This frame extraction may be done in a way that ensures no loss in visual information during frame extraction, as well as optimizes the number of frames extracted per second. If the video content varies in motion complexity over time, the frame interval may be dynamically adjusted based on the content of each segment of the video. The output from the block 210 is provided to an image captioning block 212 for further processing.

The image captioning block 212 may be used for image captioning on each of the extracted frames individually using an open-source multimodal model. The multimodal captioning model operates by integrating both textual and visual information to generate captions for images. The multimodal captioning model then merges these two modalities (image and textual embeddings) into a unified representation space such that the embeddings with similar contextual meaning, regardless of their modality, are grouped closely, facilitating accurate caption generation.

Each frame fi of the input original video V undergoes a captioning process through a multimodal model, yielding a set of captions $C_i$. These captions are individual text strings that semantically represent the visual content of each corresponding frame. To synthesize a coherent video summary, the sequence of captions $\{C_1, C_2, \ldots, C_n\}$ generated for frames $\{f_1, f_2, \ldots f_n\}$ is concatenated at a video description/synopsis generation block 214, in a manner that preserves the temporal and chronological integrity of the video narrative. This concatenation can be formalized as:

$$S = \bigoplus{}^{n_i=1} C_i$$

Here S is the final concatenated description, $C_i$ is the caption of the i-th frame, and @ denotes the concatenation operation maintaining the sequential progression of frames. This method ensures that the synthesized summary retains the contextual flow of events as depicted in the original video content. The final concatenated description S from the video description/synopsis generation block 214 may be provided to the LLM model 216. The LLM model 216 may be provided a prompt by a block summary objective/keywords 218 to generate summary as text or chunks by the LLM model 216. An extractive summary block 224 generates the interim summarization as the summary of the text to provide it further to the LLM model 216.

In an aspect, the operations of the system 200 further includes first vectorizing the first discrete chunks of the text to define first vectors and second vectorizing the second discrete chunks of the summary to define second vectors. Thereafter, match each of the second vectors to its corresponding one of the first vectors and identify, for the matched second vectors, the timestamp for the corresponding first vector. Further, extracting video clips from the original video corresponding to at least some of the identified timestamps for the matched second vectors. The first vectorizing, the first discrete chunks and the first vectors correspond to the original video that was input at the input video 202. The second vectorizing, the second discrete chunks and the second vectors correspond to the processed video summary/text received from the LLM model 216, the extractive summary blocks 222, 224 and the embedding model 226.

In an example, there may be different approaches for summarization, for example—BERT (encoder-only). In another example, a pre trained decoder only transformer architecture, where the information is encoded implicitly in the hidden state of the decoder and is updated in each step of the summary generation process. The extractive summarization aims to condense long texts into shorter versions by directly extracting sentences from the source text/original text, resulting in summaries that are grammatically correct and faithful to the original text. Prompts maybe used in such a way that the summary is generated on an extract-then-generate format, which helped in alleviating the hallucination problems in LLM summary generation. This may be done in 2 stages-extract salient sentences to form extractive summaries (SE) first, then use pretrained LLM model 216 to generate summaries guided by the extractive summaries. The Inference-time parameters to get deterministic results for the extractive text summary. Top-P, Top-K may experimentally tuned to an optimum value. Prompt Guardrails via custom System prompt, output validation were formulated to ensure that the summary is strictly an extractive summary. Temperature parameter was tuned to give deterministic summary.

The embedding model 226 receives summary from the extractive summary blocks 222, 224 to convert text into vectors in a space that represents semantic similarity between words. In an example, the generated summary may be compared with the original translation/transcript/synopsis to verify that the obtained summary is an extractive summary form or an abstractive summary form. The present disclosure discloses the extractive summary form to process the summary further through the embedding model 226. In case of obtaining the abstractive summary, where the abstractive summary may contain words, phrases s or text beyond the original translation/transcript/synopsis, the LLM model may submit the text back. The LLM model 216 may then return an interim summarization of the text based upon the summarization instructions that satisfies first predetermined criteria.

The LLM Model may be used to generate the extractive text summary. Further, validation logic may be implemented to ensure that the extractive text summary is generated using contents from the original transcript. The original transcript may interchangeably be referred to as original video content or original translation. The validation logic majorly checks the following criteria. The first criteria may be presence of sentences. This checks whether each sentence of the summary belongs to the original transcript. If not, re-iterate through the inference pipeline of the LLM model 216 to generate a new extractive summary. Secondly, it checks for order of sentences. In this, the validation logic checks if the sentences in the summary appear in the same order as in the original transcript. If not, re-iterate through the inference pipeline of the LLM model 216 to generate a new extractive summary. Thirdly, the validation logic checks if the length of the summary is within the specified maximum length. If not, re-iterate through the inference pipeline of the LLM Model to generate a new extractive summary. If the extractive text summary passes all the validation checks, then use it in downstream processes. else, re-iterate through the inference pipeline of the LLM Model 216 to generate a new extractive summary.

The system 200 further implements sentence-level chunking to segment the video transcript and summary texts into discrete chunks. Each chunk is then processed through the embedding model 226 to generate corresponding sets of embeddings 228, 234 for both the transcript embedding 230/synopsis embedding 236, and the summary embedding 232, 238. The transcript embedding 230, synopsis embedding 236, and the summary embedding 232, 238, together considered as embeddings 232 and 234 may then be provided to optimization block 240. The optimization block 240 optimizes the embeddings (may also be referred to as vector embeddings) 232 and 234 by applying one or more different techniques disclosed in a score match block 242, a length control block 244 and an embedding match block 246.

The similarity between transcript embedding 230, 236 and summary 232, 238 embeddings is quantified using the cosine similarity metric, a standard approach for measuring the angle between two vectors in a high-dimensional space. This metric is particularly well-suited for assessing the semantic proximity between text embeddings. The cosine similarity between two vectors u and v is calculated as follows:

$$\text{cosine\_similarity}(u, v) = \frac{u \cdot v}{\|u\| \, \|v\|}$$

Here, • denotes the dot product of the vectors, and $\|u\|$ and $\|v\|$ represent the Euclidean norms of the vectors. Through dynamic adaptive thresholding calculation, an optimal threshold value, $\theta$, was determined. This threshold is used to decide the adequacy of the similarity between embeddings: if the cosine similarity score exceeds e for the specific video, the corresponding sentences in the transcript are deemed to have a significant semantic correspondence with the summary sentences.

Further, the indices of the transcript sentences whose embeddings surpass this threshold are recorded for subsequent processing steps at a transcript Indices matching block 250, for a set of transcript or synopsis sentences $\{t_i\}$ and summary sentences $\{s_i\}$, the selection of transcript sentences can be expressed as:

$$I = \{i \mid \text{cosine\_similarity}(\text{embed}(t_i), \text{embed}(s_j)) > \Theta, \text{ for } j\}$$

where I is the set of indices of the transcript sentences that align closely with the summary content. This approach ensures a data-driven, quantitative basis for matching and selecting relevant textual information from the transcript or synopsis in relation to the summary, which is crucial for maintaining the integrity and relevance of the summarized output.

As defining a single common static similarity threshold for all videos is not possible because the distribution and scale of the scores changes with content. To fix this issue, an adaptive thresholding approach to calculate the right threshold for each video automatically is disclosed by the score match block 242. The score match block 242 implement adaptive thresholding using the main four steps cosine similarity scoring, splitting scores into two groups, optimizing group division and setting the threshold. The cosine similarity scoring calculates the similarity between summary and original transcript segments that uses the vector embeddings. These similarity scores may be stored in a list and then sorted. Further, splitting scores into two groups divide and organize the sorted scores into two subsets. Thereafter, in analyze variance it calculate the variability within each subset, in which it is analyzed that how much the scores within each group differ from their average score. Furthermore, in optimizing group division first divide the scores into two groups that enhance differences between the groups while keeping the scores within each group as consistent as possible. Thereafter, adjust the division point to maximize the distinction between groups and minimize the differences within each group. In setting the threshold, establish a threshold value between the two groups. This is done by taking the average of the highest score in the first group and the lowest score in the second group. This threshold helps in distinguishing key moments in the video based on their relevance, thus creating a concise summary.

This concise summary from the score match block 242 is provided to the length control block 244. The relevance score of the transcript segment embeddings were computed with respect to the summary objective embedding. The time stamps corresponding to the most relevant segments (descending order of relevance score) that can be fit into a given time duration (defined by user) were extracted. The video clips corresponding to the time stamps were concatenated to fit within the desired time duration which is provide as input by the user.

In an aspect, the system 200 operations further include between the identifying and the extracting, removing from consideration any specific ones of the second vectors that do not satisfy any second predetermined criteria and the extracting comprises extracting video clips from the original video corresponding to the identified timestamps of the matched second vectors that remain after the removing.

In addition to above, the original video having the human narration that passes through UC1 and that further generate transcript summary 230 and summary embeddings 232 may be provided to the embedding match block 246. The summarization process involves generating an extractive text summary, which may be crucial for accurately mapping the summarized text segments back to their corresponding original segments in the video transcript while maintaining relevant contextual integrity. This mapping utilizes a structured approach where each sentence in the transcript may be associated with a specific timestamp, effectively creating a dictionary D where $D[s]=t$ links transcript sentence s to timestamp t. To prioritize segments of the transcript that align closely with the summarization objectives, a relevance score is calculated for each segment. This score quantitatively evaluates how well a segment's content aligns with the thematic goals of the summary. Subsequently, timestamps corresponding to transcript segments are sorted in descending order based on their relevance scores. To adhere to user-defined constraints on summary length, only timestamps that fall within a specified time duration are selected. This operation can be represented as:

$$T = \{D[s] \mid \text{cosine\_similarity} \geq \Theta \text{ and } \sum \text{duration} \leq \text{max\_duration}\}$$

where $\theta$ is a threshold relevance score and max duration is the maximum allowable summary length specified by the user. Finally, the system 200 creates mini video clips corresponding to the selected timestamps and concatenates them sequentially to form a coherent summarized video. This synthesis of video clips is based on the temporal markers extracted, ensuring that the final summary video is both concise and contextually representative of the original content.

In an example as disclosed above, the original video having the human narration that passes through UC2 and that further generate synopsis embedding 236 and summary embeddings 238 may be provided to the embedding match block 246. Initially, each sentence or caption generated in the synopsis may be linked to a specific video frame. This linkage may be achieved through a precise indexing, which not only associates each caption with a frame but also records the exact timestamp or frame number from which the caption was derived. Let C denote the set of captions and T the corresponding set of timestamps or frame numbers, such that for each caption $c_i$ in C, there exists a timestamp $t_i$ in T that specifies the temporal location of the frame associated with $c_i$.

Following the generation of captions, the system identifies frame names associated with each matched transcript sentence from the preceding analysis step. These frames are compiled into a list F, where each frame $f_i$ contains content pertinent to the summarized video:

$$F = [f(c_1), f(c_2), \ldots, f(c_n)]$$

For each frame identified, the system retrieves the precise video clip from the original video using the recorded timestamps at an extracting video clip block 252. Each segment of the original video, defined by its start and end timestamps associated with consecutive frames, is extracted based on the sequence of timestamps:

$$\text{Video Segment}(f_i) = \text{Extract (Original Video, } [t_i, t_{i+1}])$$

Where Extract is a function that clips a segment from the original video starting at timestamp $t_i$ and ending at timestamp $t_{i+1}$.

Finally, these extracted video clips are seamlessly stitched together to form the summary video. The assembly of these clips into a coherent summary is guided by the sequence of frames F, ensuring that the summarized video reflects the narrative and content importance as defined by the synopsis:

$$\text{Summary Video} = \bigoplus^{n_{i+1}} \text{Video Segment}(f_i)$$

where, $\oplus$ represents the concatenation operation for video segments.

In an aspect, the system 200 operations further include to stitch the extracted video clips together to create the merged video as a shorter version of the original video. Thus, the system calculates the cosine similarity between sentence embeddings of the original transcript and the LLM-generated summary, pinpointing the most relevant sentences. These identified sentences, linked to specific video timestamps, guide the extraction and subsequent stitching of video clips using a complex post processing logic, resulting in a seamlessly summarized video.

In an example, after optimization, the obtained transcript indices may be processed to extract video clips that may be smoothened at a video smoothening block 254 and concatenated at a concatenate video clip block 256 to generate short-form videos or a summarized video 258. Thus, the identified sentences, linked to specific video timestamps may be further processed at block 248. The block 248 includes the transcript indices matching block 250, the extracting video clips block 252, the video smoothening block 254 and the concatenate video clips block 256.

Figure 3:
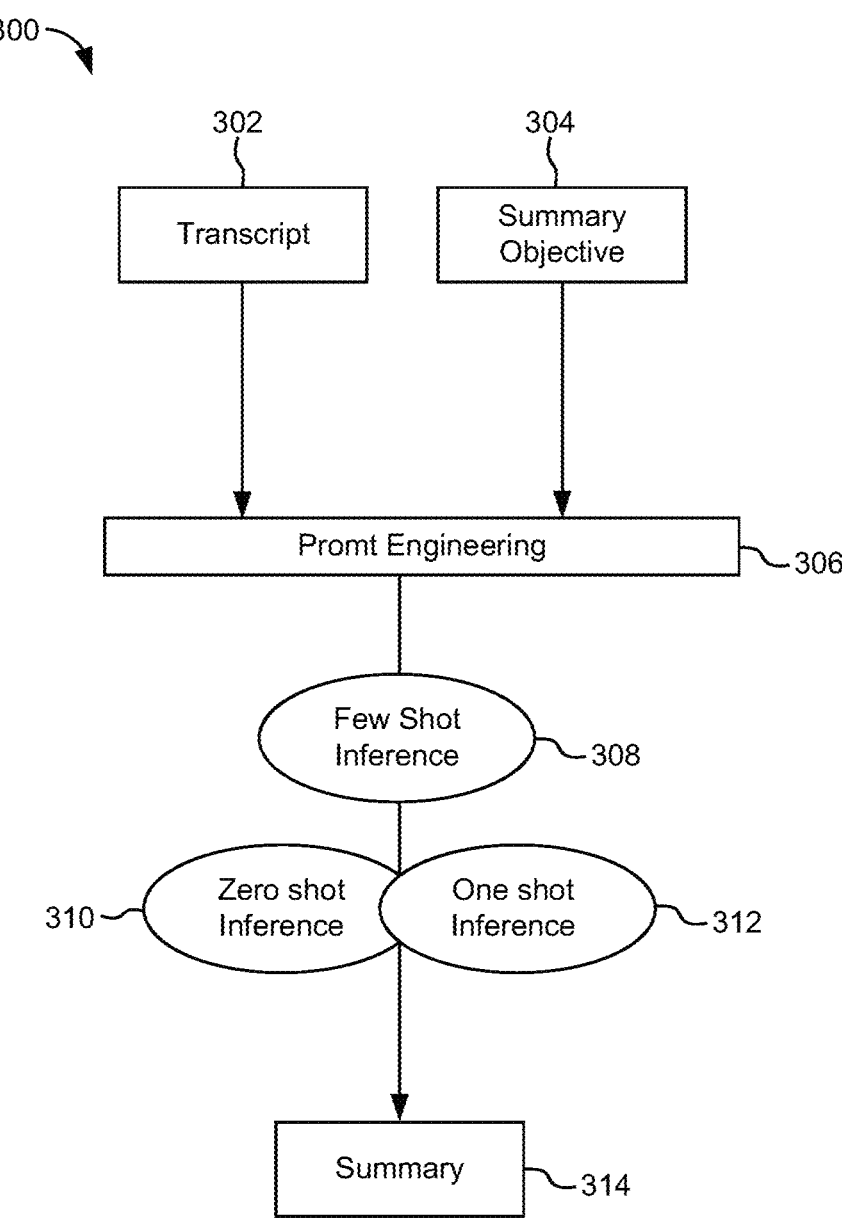
FIG. 3 illustrates a text summarization model, in accordance with present disclosure.

FIG. 3 illustrates a text summarization model 300, in accordance with present disclosure. The model (interchangeably may be referred to as text summarization model) 300 includes a transcript 302, a prompt engineering block 306, a summary objective block 304, a few shot inference 308, a zero shot inference 310, a one shot inference 312, and a summary 314. Crafting of meta-prompt that provide context and guidance to the model for generating extractive summaries. The AI engine utilizes a transformer-based architecture that can be fine-tuned specifically for deterministic extractive summarization of textual representations derived from audio-visual data. The essence of extractive summarization within this context may be to directly utilize and reorganize specific subsets of the original text, ensuring that the generated summary 314 remains true to the source data from transcript 302 without introducing non-factual elements. The inference-time parameters, the few shot inference 308, the zero shot inference 310, and the one shot inference 312, may be strategically adjusted to produce deterministic and consistent extractive summaries from the textual content derived from original video or audio-visual data stored in the summary objective block 304. To mitigate variability and ensure repeatability in the generated summaries, specific parameters controlling the sampling behavior of the transformer-based model may be fine-tuned. The temperature parameter T, which governs the sharpness of the probability distribution used for selecting words, may be modulated to a lower value to reduce randomness in the choice of words, thus favoring more likely words in the distribution. Furthermore, to control the breadth of the sampling distribution, the parameters top_p and top_k were tuned. The top_k parameter limits the selection pool to the k most probable next words, and the top_p parameter (nucleus sampling) restricts the cumulative probability to p pruning less likely words from the sampling pool. These modulations ensure that the model's output remains consistent across different inference sessions, crucial for applications requiring high reliability and traceability of the AI-generated content. FIG. 3 also describes the summary objective/keywords block 218, 220 in connection with FIG. 1.

Figures 4, 5:
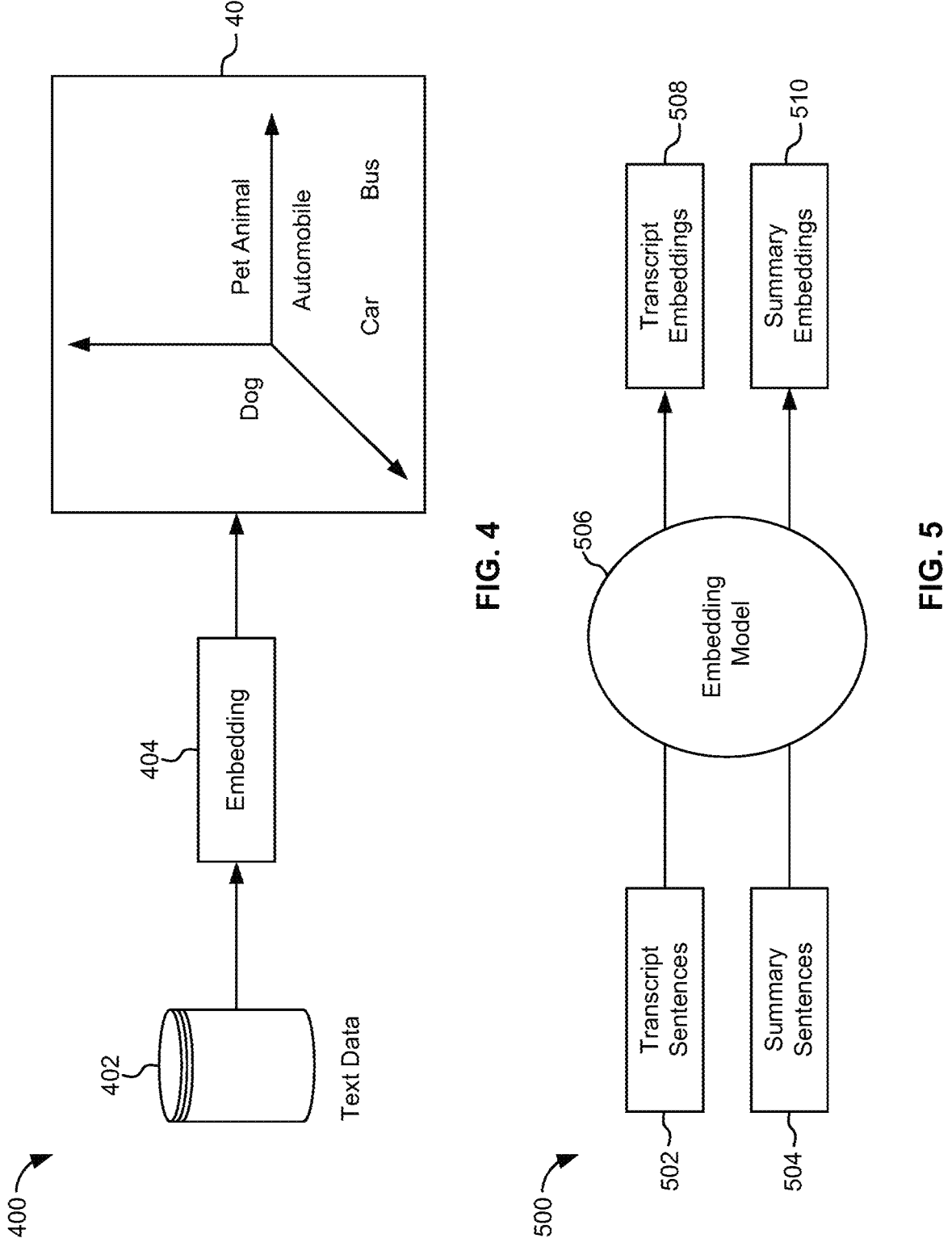
FIG. 4 illustrates an example of embedding generation into a high-dimensional latent space, in accordance with present disclosure.
FIG. 5 illustrates an exemplary embedding model, in accordance with the present disclosure.

FIG. 4 illustrates an example of embedding generation technique 400 into a high-dimensional latent space, in accordance with present disclosure. In the present disclosure, text embeddings 404 are leveraged to project textual data or text data 402 into a high-dimensional latent space 406, which is mathematically characterized as a manifold. Within this manifold 406, semantic proximity is quantified such that text segments exhibiting higher semantic similarity are positioned closer together in the vector space. This proximity can be mathematically described using a distance function $d(x,y))$ where x and y are text embeddings, ensuring that for semantically similar sentences s1 and s2, the condition $d((embed(s1), (embed(s2))<\in$ FIG. 5 illustrates an exemplary embedding model 500, in accordance with the present disclosure. The system implements sentence-level chunking to segment the video transcript at a transcript sentence block 502 and summary texts into discrete chunks using summary sentences block 504. Each chunk is then processed through an embedding model 506 to generate corresponding sets of embeddings for both transcript/synopsis at transcript embeddings block 508 and summary at a summary embeddings block 510. The sequence of embeddings is preserved in accordance with the chronological order of the original transcript. This allows for a precise mapping back to specific video clips, facilitating accurate alignment with the original video content. Given the complexity of capturing interdependencies and semantic relationships between elements within the text, a pre-trained model with a robust understanding of linguistic structures was employed. Pre-trained models, particularly those trained on extensive corpora, offer superior performance over traditional statistical approaches by understanding deeper semantic relations. The model disclosed in the FIG. may use the Generative AI based techniques or an open source, pre-trained mode.

FIG. 6 illustrates a flow diagram that presents an example method for video summarization, in accordance with present disclosure. The flow diagram 600 discloses a method of converting an original video into a merged video (merged video may interchangeably be referred to as short-form video or summarized video). The method discloses a step 602 to first receive the original video, text based on the original video, and a list of summarization instructions at the input video 202. The method further discloses at step 604 to first generate timestamps for first discrete chunks of the text, each timestamp defines at least a start time of the corresponding first discrete chunk within the original video. The method further discloses at step 606 second receiving a summary of the text based on the summarization instructions, the summary including second discrete chunks from the text. The method further discloses at step 608 regarding first vectorizing the first discrete chunks of the text to define first vectors and at step 610 second vectorizing the second discrete chunks of the summary to define second vectors. Thereafter, at step 612, match each of the second vectors to its corresponding one of the first vectors. The method further discloses step 614 to identify for the matched second vectors, the timestamp for the corresponding first vector. Moreover, at step 616, based on the identified timestamps for the matched second vectors, extract video clips from the original video corresponding to at least some of the identified timestamps for the matched second vectors. At step 618, stitch the extracted video clips together to create the merged video as a shorter version of the original video (also referred to as summarized video or merged video or short-form video). Referring now to FIG. 7, a method further discloses a flow diagram 700 of steps that occur between the first receiving 602 and the second receiving 604. At step 702, submitting the text to a large language model ("LLM") 216 that returns an interim summarization of the text based upon the summarization instructions. At step 704, determining if the interim summarization satisfies first predetermined criteria. At step 706, return, in response to a negative result of the determining, to the submitting at step 702 with additional instructions for the LLM model. If the interim summarization satisfies the first predetermined criteria, setting at step 708, the interim summarization as the summary of the text. The first predetermined criteria include a maximum text length of the interim summarization, the interim summarization includes content that matches content of the text, and/or an order of content within the interim summarization matches an order in which content is present in the text.

It should be appreciated that the Gen AI powered video summarizer disclosed in the present disclosure efficiently condense long video content into engaging, short-form videos. The short videos can summarize videos with or without audio narration, tailored to user-defined contexts.

This tool focuses on generating concise versions of the original videos that align with specific summarization objective provided by the user. The applications of the video summarizer include but not limited to creating thematic brand marketing content for social media, producing bite-sized educational videos from extensive learning materials, identifying key instructional segments in lengthy video manuals, summarizing lengthy scientific seminars in the pharmaceutical industry, and condensing news videos on required subjects etc.

The video summarizer disclosed in the present disclosure automates and refines the content adaptation process, offering a swift, flexible, and efficient alternative for creating dynamic short-form videos. The video summarizer transforms the landscape of video content production, empower companies to efficiently utilize their digital media and extract key information that can be used for many purposes including but not limited to video search, information extraction from medical videos and many more. It facilitates creative experimentation, enabling users to effortlessly generate multiple versions of summarized video content, thus saving resources, time and increasing productivity.

Figure 8:
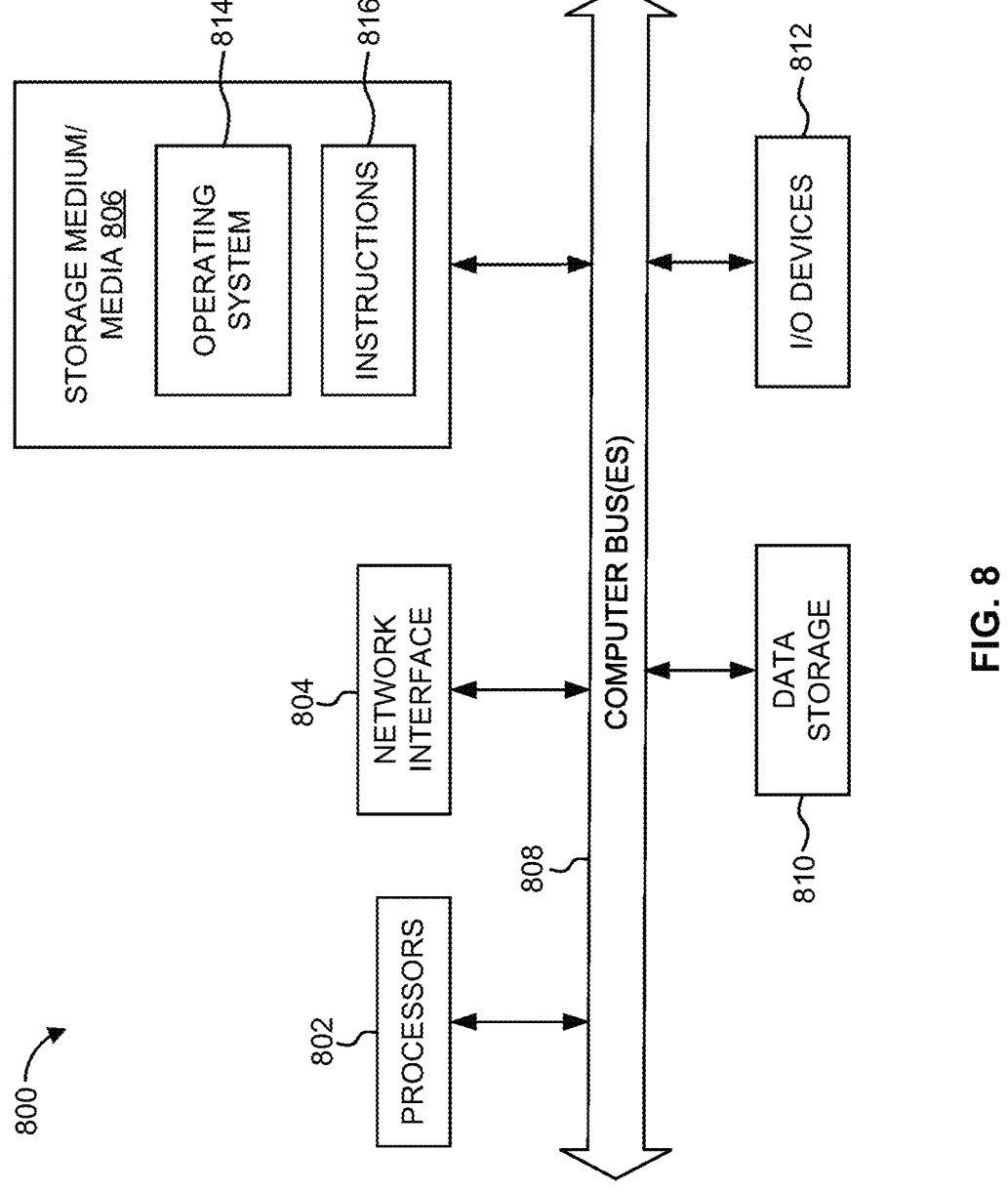
FIG. 8 illustrates a computer system 800 used for video summarization.

FIG. 8 illustrates a computer system 800 used for video summarization. More particularly, computing machines such as desktops, laptops, smartphones, tablets, and wearables which may be used to store videos often have limited storage structure of the computer system 800. The computer system 800 may include additional components not shown and that some of the process components described may be removed and/or modified. In another example, a computer system 800 can sit on external-cloud platforms such as Amazon Web Services, AZURE® cloud or internal corporate cloud computing clusters, or organizational computing resources, etc.

The computer system 800 includes processor(s) 802, such as a central processing unit, ASIC or another type of processing circuit, input/output devices 812, such as a display, mouse keyboard, etc., a network interface 804, such as a Local Area Network (LAN), a wireless 802.11x LAN, a 3G or 4G mobile WAN or a WiMax WAN, and a processor-readable medium 806. Each of these components may be operatively coupled to a bus 808. The computer-readable medium 806 may be any suitable medium that participates in providing instructions to the processor(s) 802 for execution. For example, the processor-readable medium 806 may be non-transitory or non-volatile medium, such as a magnetic disk or solid-state non-volatile memory or volatile medium such as RAM. The instructions or modules stored on the processor-readable medium 806 may include machine-readable instructions 864 executed by the processor(s) 802 that cause the processor(s) 802 to perform the methods and functions of the video summarization system 200.

The video summarization system 200 may be implemented as software stored on a non-transitory processor-readable medium and executed by the processors 802. For example, the processor-readable medium 806 may store an operating system, such as MAC OS, MS WINDOWS, UNIX, or LINUX, and code for the context sanitization and re-enrichment system 200. The operating system may be multi-user, multiprocessing, multitasking, multithreading, real-time, and the like. For example, during runtime, the operating system is running and the code for the video summarization system 200 is executed by the processor(s) 802.

The computer system 800 may include a data storage 810, which may include non-volatile data storage. The data storage 810 stores any data used by the video summarization system 200. The data storage 810 may be used to store information extracted from the user query and other data that is used by the video summarization system 200 during operation.

The network interface 804 connects the computer system 800 to internal systems for example, via a LAN. Also, the network interface 804 may connect the computer system to the Internet. For example, the computer system 800 may connect to web browsers and other external applications and systems via the network interface 804.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A method for converting an original video into a merged video, comprising:
   first receiving the original video, text based on the original video, and a list of summarization instructions;
   first generating timestamps for first discrete chunks of the text, each timestamp defining at least a start time of the corresponding first discrete chunk within the original video;
   second receiving a summary of the text based on the summarization instructions, the summary including second discrete chunks from the text;
   first vectorizing the first discrete chunks of the text to define first vectors;
   second vectorizing the second discrete chunks of the summary to define second vectors;
   matching each of the second vectors to its corresponding one of the first vectors;
   identify, for the matched second vectors, the timestamp for the corresponding first vector;
   extracting video clips from the original video corresponding to at least some of the identified timestamps for the matched second vectors;
   stitching the extracted video clips together to create the merged video as a shorter version of the original video;
   determining whether the original video includes human narration;
   second generating, in response to a positive result of the determining, a transcript of the original video as the text; and
   third generating, in response to a negative result of the determining, the text by:
      sampling image frames of the video at predetermined intervals,
      creating a text caption for each of the sampled image frames, and
      combining the created text captions, in order, to define the text.

2. The method of claim 1, further comprising between first generating and the second receiving:
   submitting the text to a large language model ("LLM") that returns an interim summarization of the text based upon the summarization instructions;
   determining whether the interim summarization satisfies first predetermined criteria;
   returning, in response to a negative result of the determining, to the submitting with additional instructions for the LLM model; and
   setting, in response to a positive result of the determining, the interim summarization as the summary of the text.

3. The method of claim 2, wherein the first predetermined criteria include:
   a maximum text length of the interim summarization;
   the interim summarization includes content that matches content of the text; and/or
   an order of content within the interim summarization matches an order in which content is present in the text.

4. The method of claim 2, wherein the additional instructions include:
   produce the interim summarization within a maximum length;
   remove content from the interim summarization that is different from content of the text; and/or
   maintain an order of content as present in the text.

5. The method of claim 1, further comprising between the identifying and the extracting:

removing from consideration any specific ones of the second vectors that do not satisfy any second predetermined criteria; and the extracting comprises extracting video clips from the original video corresponding to the identified timestamps of the matched second vectors that remain after the removing.

6. The method of claim 1, wherein the first discrete chunks of text correspond to discrete sentences in the text, and the second discrete chunks correspond to a subset of the discrete sentences in the text and/or portions of individual discrete sentences in the text.

7. A non-transitory computer readable media storing instructions programmed to cooperate with electronic computer hardware in combination with software to perform operations for converting an original video into a merged video, the operations comprising:

first receiving the original video, text based on the original video, and a list of summarization instructions;

first generating timestamps for first discrete chunks of the text, each timestamp defining at least a start time of the corresponding first discrete chunk within the original video;

second receiving a summary of the text based on the summarization instructions, the summary including second discrete chunks from the text;

first vectorizing the first discrete chunks of the text to define first vectors;

second vectorizing the second discrete chunks of the summary to define second vectors;

matching each of the second vectors to its corresponding one of the first vectors;

identify, for the matched second vectors, the timestamp for the corresponding first vector;

extracting video clips from the original video corresponding to at least some of the identified timestamps for the matched second vectors;

stitching the extracted video clips together to create the merged video as a shorter version of the original video;

determining whether the original video includes human narration;

second generating, in response to a positive result of the determining, a transcript of the original video as the text; and third generating, in response to a negative result of the determining, the text by:

sampling image frames of the video at predetermined intervals, creating a text caption for each of the sampled image frames, and combining the created text captions, in order, to define the text.

8. The non-transitory computer readable media of claim 7, wherein the operations further comprising between the first generating and the second receiving:

submitting the text to a large language model ("LLM") that returns an interim summarization of the text based upon the summarization instructions;

determining whether the interim summarization satisfies first predetermined criteria;

returning, in response to a negative result of the determining, to the submitting with additional instructions for the LLM model; and setting, in response to a positive result of the determining, the interim summarization as the summary of the text.

9. The non-transitory computer readable media of claim 8, wherein the first predetermined criteria include:

a maximum text length of the interim summarization;

the interim summarization includes content that matches content of the text; and/or an order of content within the interim summarization matches an order in which content is present in the text.

10. The non-transitory computer readable media of claim 8, wherein the additional instructions include:

produce the interim summarization within a maximum length;

remove content from the interim summarization that is different from content of the text; and/or maintain an order of content as present in the text.

11. The non-transitory computer readable media of claim 7, wherein the operations further comprising between the identifying and the extracting:

removing from consideration any specific ones of the second vectors that do not satisfy any second predetermined criteria; and the extracting comprises extracting video clips from the original video corresponding to the identified timestamps of the matched second vectors that remain after the removing.

12. The non-transitory computer readable media of claim 7, wherein the first discrete chunks of text correspond to discrete sentences in the text, and the second discrete chunks correspond to a subset of the discrete sentences in the text and/or portions of individual discrete sentences in the text.

13. A system, comprising:

a processor;

a non-transitory computer readable media storing instructions programmed to cooperate with the processor to perform operations for converting an original video into a merged video, the operations comprising:

first receiving the original video, text based on the original video, and a list of summarization instructions;

first generating timestamps for first discrete chunks of the text, each timestamp defining at least a start time of the corresponding first discrete chunk within the original video;

second receiving a summary of the text based on the summarization instructions, the summary including second discrete chunks from the text;

first vectorizing the first discrete chunks of the text to define first vectors;

second vectorizing the second discrete chunks of the summary to define second vectors;

matching each of the second vectors to its corresponding one of the first vectors;

identify, for the matched second vectors, the timestamp for the corresponding first vector;

extracting video clips from the original video corresponding to at least some of the identified timestamps for the matched second vectors;

stitching the extracted video clips together to create the merged video as a shorter version of the original video;

determining whether the original video includes human narration;

second generating, in response to a positive result of the determining, a transcript of the original video as the text; and third generating, in response to a negative result of the determining, the text by:

sampling image frames of the video at predetermined intervals, creating a text caption for each of the sampled image frames, and combining the created text captions, in order, to define the text.

14. The system of claim 13, wherein the operations further comprising between the first generating and the second receiving:

submitting the text to a large language model ("LLM") that returns an interim summarization of the text based upon the summarization instructions;

determining whether the interim summarization satisfies first predetermined criteria;

returning, in response to a negative result of the determining, to the submitting with additional instructions for the LLM model; and setting, in response to a positive result of the determining, the interim summarization as the summary of the text.

15. The system of claim 14, wherein the first predetermined criteria include:

a maximum text length of the interim summarization;

the interim summarization includes content that matches content of the text; and/or an order of content within the interim summarization matches an order in which content is present in the text.

16. The system of claim 14, wherein the additional instructions include:

produce the interim summarization within a maximum length;

remove content from the interim summarization that is different from content of the text; and/or maintain an order of content as present in the text.

17. The system of claim 13, the operations further comprising between the identifying and the extracting:

removing from consideration any specific ones of the second vectors that do not satisfy any second predetermined criteria; and the extracting comprises extracting video clips from the original video corresponding to the identified timestamps of the matched second vectors that remain after the removing.

* * * * *